United States Patent
Schneider et al.

(10) Patent No.: US 7,781,521 B2
(45) Date of Patent: Aug. 24, 2010

(54) FURFURAL-UREA RESINS AND ADHESIVES AND THEIR METHODS OF PRODUCTION

(75) Inventors: Marc Henry Schneider, Fredericton (CA); Jonathan Greer Phillips, Fredericton (CA)

(73) Assignee: Infinity Wood Ltd., Fredericton, New Brunswick (CA)

( * ) Notice: Subject to any disclaimer, the term of this patent is extended or adjusted under 35 U.S.C. 154(b) by 510 days.

(21) Appl. No.: 11/819,950

(22) Filed: Jun. 29, 2007

(65) Prior Publication Data
US 2009/0005504 A1    Jan. 1, 2009

(51) Int. Cl.
*C08L 61/00* (2006.01)
(52) U.S. Cl. ............... 524/843; 524/593; 524/597; 524/598; 528/259; 528/368
(58) Field of Classification Search .......... 524/593, 524/597, 598, 843; 528/259, 368
See application file for complete search history.

(56) References Cited

U.S. PATENT DOCUMENTS 1,827,824  A    10/1931   Novotny et al.

FOREIGN PATENT DOCUMENTS

CA    567431    12/1958

*Primary Examiner*—Edward J Cain
(74) *Attorney, Agent, or Firm*—Lynn C. Schumacher; Hill & Schumacher

(57) ABSTRACT

This invention provides methods for producing furfural-urea resins and adhesives. The includes dissolving urea in hot water to produce a hot aqueous solution, mixing furfural with the aqueous solution, adding an acid catalyst such as maleic anhydride to the furfural containing aqueous solution upon which a resinification reaction begins immediately. The resinification reaction is quenched by cooling to a pre-selected temperature to produce a resin or adhesive.

30 Claims, No Drawings

FURFURAL-UREA RESINS AND ADHESIVES AND THEIR METHODS OF PRODUCTION

FIELD OF THE INVENTION

This invention relates to furfural-urea resins and adhesives and their methods of production.

BACKGROUND OF THE INVENTION

Urea $CO(NH_2)_2$ is a diamide. It is acidic when in fresh solution and becomes alkaline upon standing. That is because it hydrolyzes to $CO_2$ and ammonia ($NH_3$). Urea forms resins with aldehydes. The most commonly used aldehyde is formaldehyde to produce urea-formaldehyds (UF) resins. These resins find wide use as wood adhesives. At one time, they were used as colorless wood hardeners.

Main disadvantages of UF adhesive resins are the sensitivity of the bond to moisture and the volatility and toxicity of their formaldehyde component. UF resins emit formaldehyde when curing, and can also emit it from a glued product.

Aldehydes besides formaldehyde will react with urea to form resins. Furfural is one of the examples. Furfural has lower vapor pressure than formaldehyde, so there are lower emissions. Furfural-urea resins are dark, crosslinked and waterproof. Furfural and urea are widely found in nature and are cheap commercial chemicals. Furfural is a derivative of pentosans found in plants. Major commercial sources are sugar cane bagasse and agricultural residues.

Maleic anhydride (MA) can be synthesized in high yield from furfural (Sugar series 13 p 225). MA is useful for acidifying resinification mixtures and has the potential of becoming part of the resin. It also can be a coupling agent between resin and substrate. Maleic anhydride is a widely-used industrial chemical. Important uses are in polyesters and plastics compatibilizing agents.

Previous Published Work

There was work done on furfural-urea (FUR) resins in the early 20th century (e.g. p 669-670 of The Chemistry of Synthetic Resins by Carleton Ellis, Reinhold Publishing, 1935). It has been mentioned in another textbook (p119 of Urea-Formaldehyde Resins by Beat Meyer, Addison Wesley Publishing Company, 1979).

FUR resins were mentioned as wood stabilization compounds in a 1960 article, but no data on properties or methods of preparation were given (Weaver, J W, J F Neilson and L S. Goldstein. 1960. Dimensional stabilization of wood with aldehydes and related compounds. FPJ June pp 306-310).

Therefore, a need still exists for an efficient and economical method of producing resins and adhesives based on furfural and urea.

SUMMARY OF THE INVENTION

In accordance with one embodiment of the present invention, there is provided a method for producing furfural-urea resin and adhesive, comprising the steps of:

a) dissolving urea in hot water to produce a hot aqueous solution;

b) mixing furfural with said aqueous solution;

wherein step a) or b) further comprises adding an acidic catalyst, and upon completion of step b), a resinification reaction begins immediately; and c) quenching the resinification reaction by cooling to a pre-selected temperature to produce a resin.

In another aspect of the invention there is provided a method for producing furfural-urea resin and adhesive, comprising the steps of:

a) dissolving urea in hot water to produce a hot aqueous solution of dissolved urea;

b) making a solution of an acidic catalyst in furfural at a temperature in a range from about 15° C. to about 30° C.;

c) adding said solution of an acid catalyst in furfural to said hot aqueous solution of dissolved urea with vigorous stirring to produce a mixed solution in which polymerization of the furfural, urea and the catalyst takes place; and d) allowing this mixed solution between about 15 to about 30 seconds to react; then e) simultaneously cooling, diluting and agitating said mixed solution to quench said polymerization reaction and to disperse the reaction products into small droplets which produces a wet emulsion of partially polymerized droplets that do not continue fast polymerization.

This results in a suspension of partially polymerized droplets that do not continue fast polymerization.

DETAILED DESCRIPTION OF THE INVENTION

The methods described herein are directed, in general, to resins and adhesives produced from furfufural-urea-organic acid/anhydride mixtures and methods of producing these resins and adhesives. Although embodiments of the present invention are disclosed herein, the disclosed embodiments are merely exemplary.

Therefore, specific structural and functional details disclosed herein are not to be interpreted as limiting but merely as a basis for the claims and as a representative basis for enabling someone skilled in the art to employ the present invention in a variety of ways. For purposes of instruction and not limitation, the illustrated embodiments are all directed to embodiments of resins and adhesives produced from furfufural-urea-organic acid/anhydride mixtures and methods of producing these resins and adhesives.

As used herein, the term "about", when used in conjunction with ranges of concentrations of constituents of various formulations or other physical properties or characteristics, is meant to cover slight variations that may exist in the upper and lower limits of the ranges of concentrations so as to not exclude embodiments with concentrations slightly above or below those recited herein. It is not the intention to exclude embodiments such as these from the present invention.

As used herein, the phrase "resin" means a high molecular weight substance (also named pre-polymer or oligomer) that will subsequently be reacted to form a solid high polymer.

As used herein, the phrase "adhesive" means a glue to hold materials together, a laminating resin and a matrix resin to hold materials together. Examples of the materials include, but are not limited to, solid wood, wood veneer, particles, flakes, fibers and other comminuted wood, corn, kenaf and the like and man-made fibers like glass.

Therefore, a resin as used herein is a pre-polymer or low molecular weight polymer which can be spread and mixed with things in the pre-polymer state. When cured into a high polymer it can form the matrix of a composite or be an adhesive. It is an adhesive when used in a thin layer to hold things together. It is a matrix when it forms a substantial part of the composite, both holding it together and adding strength.

As used herein, the phrase "resinification" means reacting low molecular weight or monomeric chemicals to the resin stage and "curing" means reacting (or polymerizing) the resin to a solid adhesive or matrix material.

Dissolution of urea in hot (55 to 100 C) furfural is endothermic and quickly forms a light brown, waxy paste. This is the extent of the reaction if only these two components are mixed. The brown, waxy paste has insufficient mechanical properties to be used as a resin or adhesive. It cannot be crosslinked to a useful polymer by heating.

If sufficient acidic catalyst is added to the original urea and furfural solution, a vigorous polymerization reaction occurs. The polymer formed is hard, dark and crosslinked. Experience has shown that for 100 parts by weight of furfural, between 15 and 20 parts urea, with equal parts of organic acid or anhydride reaction catalysts, form a very hard (shore D hardness=93-95), black polymer. The polymer is insoluble in methanol and water and has excellent heat and flame resistance. A buffer can be added to the formulation to control pH. The pH control allows easier mixing and extends working life of the mixture. Using a combination buffer and active biodeterioration retarder like borax can increase resistance of material made with the mixture to mold, decay, insect attack and the like.

In one embodiment, the method of the present invention comprises the following steps:

1-a) Make a solution of urea, catalyst (any of for example, but not limited to, maleic anhydride, phthalic anhydride, formic acid, citric acid, or lactic acid) and other ingredients (buffer, lignin) in hot (70 to 100 C) water. The heat is needed to dissolve the urea. The solution thus formed is kept warm to prevent precipitation of the various components. The temperature range required is 25 C to 50 C, depending upon the solution concentration;

2-a) Add the solution from step 1) to furfural to produce the reactive formulation wherein resinification to make a useful resin begins immediately, 3-a) cool the formulation to room temperature to quench the resinification reaction. Pot life of the mixture depends upon acid catalyst and buffer concentrations.

In another embodiment, the method of the present invention comprises the following steps:

1-b) Make a solution of urea in water using about 2 parts urea to 1 part water for an adhesive hot press formulation where steam generation must be minimized, or about 1 part urea to 1 part water for applications where the extra water is acceptable. Using water at a temperature of 55 C to 100 C facilitates solution formation. The 2:1 urea:water mixture must be kept at about 50 C to 60 C until it is mixed with a second solution. If it cools, the urea precipitates. The 1:1 urea:water mixture can be kept at room temperature.

2-b) Make a second solution of maleic anhydride, formic or citric acid in furfural. This is at room temperature.

3-b) Add the solutions in steps 1-b) and 2-b) together with vigorous mixing. This produces a mixture that darkens quickly as it reacts.

4-b) The mixed solution of step 3-b) is quenched within 15 to 30 seconds by diluting with cool water and agitating vigorously. This produces a brown emulsion of partially polymerized droplets that do not continue fast polymerization. Pot life of this emulsion is 2 to 3 hours at room temperature. Pot life can be adjusted upwards or downwards by changing the amount of catalysts and buffers in the solution. Cooling the solution lengthens pot life.

5-b) Alternatively to step 4-b), quenching can be done by rapid cooling of the mixture of 3-b) which is then kept cool (well below room temperature).

The solution of step 3-a) has a shelf life of about 1 hour. It can be adjusted by changing catalyst and buffer concentration, cooling or drying. The solutions of step 4-b) or 5-b) have a shelf life of about 3 hr at room temperature and longer if cooled. The solution of steps 3-a), 4-b) or 5-b) can be polymerized very quickly by heating to standard plywood, particleboard or oriented strand board press temperatures. Polymerization can alternatively be done more slowly at temperatures in the 50 to 100 degrees C. range. The lower temperature curing reduces steam emission effects. The solution can be used as an adhesive, surface hardener, prepreg or composite matrix resin by heat curing in either temperature range.

Alternately, the mixture from steps 3-a) or 4-b) can be dried and stored at room temperature. Later the dried formulation can be heated to 100 to 160 degrees C. to quickly cure it to a hard, crosslinked polymer. The dried solution can be used as an adhesive, surface hardener, prepreg or composite matrix resin by re-heating this way.

A preferred acidic catalyst is maleic anhydride. Strictly speaking, maleic anhydride is not an acid, but it does impart an acidic effect (low pH) to the formulation. Thus, as used herein, the phrase "acidic catalyst" is meant to cover maleic anhydride even though it is not an acid by definition. As mentioned above, maleic anhydride is a preferred compound to obtain the needed acidity because less of it is needed than some other true acids (like citric acid) and because it is thought to be covalently incorporated into the resin rather than just acting only as a catalyst. Alternative acidic catalysts that may be used include, but are not limited to: phthalic anhydride, formic acid, citric acid, or lactic acid which are true acids by definition. The key function of the acidic catalyst is to make the solution mildly acidic, so those skilled in the art will appreciate that many organic acids, mineral acid salts and dilute mineral acids and combinations of them may be used including dilute sulfuric acid, dilute hydrochloric acid, zinc chloride and ferric chloride.

The key function of the acidic catalyst is to make the solution mildly acidic, so those skilled in the art will appreciate that many organic acids, mineral acid salts and dilute mineral acids and combinations of them may be used including dilute sulfuric acid, dilute hydrochloric acid, zinc chloride and ferric chloride.

While borax above is a preferred buffer, other buffers may also be used, with the Table 1 below giving several alternatives and their attributes.

TABLE 1

BUFFERS, THEIR NAMES AND ATTRIBUTES

| Buffer | Common name | Attributes in formulation |
| --- | --- | --- |
| Sodium bicarbonate | Baking soda | pH increases slowly with heat (a disadvantage) |
| Sodium carbonate | Washing soda or soda ash | pH decreases with heat (advantage for curing) |
| Sodium tetraborate decahydrate | Borax | pH does not change with temperature |
| Sodium formate | — | Behaves similarly to borax |

Broadly speaking, taking into account that different catalysts and buffers may be used, the Table 2 below gives the broad concentration ranges for useful formulations according to the present invention.

TABLE 2

BROAD RANGE OF CONSITUENTS

| Consitituent | Function | Parts by weight |
|---|---|---|
| Furfural | Main constituent | 100 (base material) |
| Urea | Main constituent | 20 to 50 |
| Maleic anhydride or citric acid | Catalyst | 5 to 30 |
| Formic acid or lactic acid | Alternate catalysts to maleic anhydride and citric acid | 40 to 100 |
| Buffer | Control shelf life and curing reaction | 0 to 5 |
| Water | Solvent | 10 to 200 |

A preferred formulation includes furfural, urea, and maleic anhydride as an acidic catalyst. Table 3 below gives the preferred concentrations of these constituents.

TABLE 3

PREFERRED COMPOSITION AND CONCENTRATIONS

| Constituent | Parts by weight |
|---|---|
| Furfural | 100 |
| Urea | 20 |
| Maleic anhydride | 20 |
| Water | 15 |

An alternative method of mixing solutions from steps 1-a) and 2-a) or 1-b) and 2-b) is to combine them in a nozzle that is spraying into a drier to be dried or onto flakes, fibers, particles or other comminuted materials to be glued or onto surfaces to be hardened. Spraying of fiber (such as glass, wood, kenaf, corn or hemp) mats can also be done. The resin is then heated to cure it. Simultaneous pressing and heating consolidates the particulate or fibrous material, cures the resin and forms a composite material. In an assembly of wood parts (such as veneer or lumber), it cures the adhesive bond between the parts.

The spraying can also be done onto a drying plate or into a freeze dryer. The dried resin produced this way can be used for adhesives and matrix media in fiber composites.

An example formulation for an FUR polymerizable mixture from solutions in steps 1-a) and 2-a) above is given in Table 4.

TABLE 4

FUR FORMULATION EXAMPLE 1

| | Component | Parts by weight |
|---|---|---|
| Solution 1 | Urea | 20 |
| | Water | 20 |
| | Maleic anhydride | 5 |
| | Borax | 5 |
| Solution 2 | Furfural | 100 |

The first formulations developed by the inventors, such as from Table 4, were polymerized in test tubes to determine their potential for making useful polymers. Formulations that produced good polymers in this test tube screening were used as the basis of trial wood adhesives. Adding a small amount of lignin helped control viscosity for some adhesive applications. When lignin is included in greater amount it appears to become part of the polymer, possibly co-polymerizing with furfural-urea. Filler (wood flour) was also added in some cases to improve bonding. An example adhesive formulation is shown in Table 5.

TABLE 5

EXAMPLE WOOD ADHESIVE FORMULATION.

| | Component | Parts by weight |
|---|---|---|
| Solution 1 | Urea | 20 |
| | Water | 10 |
| | Borax | 5 |
| Solution 2 | Maleic anhydride | 5 |
| | Furfural | 100 |
| Additive | Wood flour | 20 |

Other mixtures were tried. Substitution of other organic acids such as citric acid and formic acid for maleic anhydride was successful. Varying the amount of acid was also done. Another aldehyde (glyoxal) was added to the urea-maleic anhydride mix in another trial and a stronger polymer resulted.

Without being limited to any theory, it is believed by the inventors that the key function of the aldehyde is to react with the urea to produce the resin, so those skilled in the art will appreciate that many aldehydes and combinations of them may be used including acetaldehyde, propionaldehyde, n-butyraldehyde, isobutyraldehyde, n-valeraldehyde, isovaleraldehyde, n-caproaldehyde, acrolein (propenal), crotonaldehyde, gluteraldehyde and benzaldehyde.

Furfural is a preferred aldehyde for this invention because of its good reactivity, ability to form a strong polymer, relatively low volatility and because it is made from plant tissue, particularly agricultural residues. Thus it works well and comes from a renewable resource.

Some formulations tried by the inventors and their characteristics are given in Table 6, with mix proportions in parts by weight based on furfural.

TABLE 6

SUCCESSFUL EXAMPLE FURFURAL-UREA FORMULATIONS, PARTS BY WEIGHT

| | Formulation | | | | | |
|---|---|---|---|---|---|---|
| Component | A | C | D | E | F | G |
| Furfural | 100 | 100 | 100 | 100 | 100 | 100 |
| Urea | 50 | 20 | 20 | 30 | 25 | 25 |

TABLE 6-continued

SUCCESSFUL EXAMPLE FURFURAL-UREA FORMULATIONS, PARTS BY WEIGHT

| Component | Formulation | | | | | |
|---|---|---|---|---|---|---|
| | A | C | D | E | F | G |
| Maleic anhydride | 20 | | 30 | | | |
| Citric acid | | 20 | | 30 | 25 | 25 |
| Formic acid | | | | 100 | 50 | 40 |
| Borax | | 3 | | | | |
| Lignin | | | | 100 | 0 | 20 |
| Wood flour | | | 10 | 40 | 30 | 15 |
| Water | | 20 | 20 | 30 | 20 | 20 |
| RESULT | Hard polymer | Hard polymer | Hard polymer & good wood adhesive | Hard polymer & good wood adhesive | Hard polymer & good wood adhesive | Hard polymer & good wood adhesive |

Pot life of the mixtures can be varied from several minutes to several hours by varying the amount and type of acidic catalyst and buffer.

Pre-resinification improved wood bonding quality with some mixes. One method of pre-resinification was aging the mix at room temperature. Useful working life of about 3 hours at 20 C occurred after this ageing period. This life can be varied somewhat by changing the amount of acid and buffer. A subsequent open assembly time of about 15 to 30 minutes before hot pressing produced a good bond. Alternatively, resinification was accomplished by heating at 90° C. for 4 to 5 minutes followed by quick cooling to 17° C. After pre-resinification, the mix was applied to wood and hot-pressed. Pre-resinification of most mixes was required to get wood bonding with high wood failure.

Lignin in the mix decreases polymer strength. However, in low concentration lignin improved adhesive flow properties with little negative effect on polymer quality. Lignin may also help keep the wood flour homogeneously mixed.

The formulation variations of furfural-urea polymer tried showed that it is possible to vary amounts and types of mix ingredients, resinification times and curing temperatures within a wide range and still get high quality polymers. Fillers and viscosity controllers can help make the formulations better wood adhesives or laminating resins. Other additives could likely be found and used to good effect, mixing and curing procedures could be fine-tuned or the best of our present prototypes could be optimized.

The present invention will be illustrated with the following examples. The following examples are provided to illustrate the embodiments of the present invention. They are not intended to limit the scope of this disclosure to the embodiments exemplified therein.

EXAMPLE 1

After step 3-a) or 4-b) the mixture is ready to be applied to or mixed with wood and plant products, pressed and heated to form a bonded material. We have done this with veneer to form plywood, wood particles to form particleboard, wood fibers to form medium and high density fiberboard, corn stalk pieces to form cornboard, straw pieces to form strawboard and kenaf pieces to form kenaf board.

EXAMPLE 2

Granulated solids were made using material from step 4-b), and then spread on wood, heated and pressed. This formed a good bond. The formulation and method could therefore be the basis of a powdered resin adhesive.

EXAMPLE 3

The material of step 3-a) or 4-b) was spread onto paper and dried. This formed a pre-preg. Pre-preg is paper or other sheet material that has been pre-impregnated with a pre-polymer and dried. The pre-polymer in the pre-preg is later heated to reactivate it and cause it to flow and then cure to form a bonded laminate. The pre-preg was hot pressed onto a wood substrate at about 160 C and 700 kpa (about the standard temperature and pressure for making particleboard, plywood and oriented strand board) to cure the resin and bond the pre-preg and wood together. A hard, smooth, dark surface laminate was thus formed.

EXAMPLE 4

The liquid of step 3-a) or 4-b) was spread on a glass fiber mat, stored for 1 hour in the open at room temperature to pre-resinify then hot pressed (about 160 C and 100 kpa or 1 atm). A glass fiber composite resulted.

EXAMPLE 5

The mixture of solutions from steps 3-a) or 4-b) was spread on a wood surface and quickly hot-pressed to liquefy and drive the resin into the wood and then cure the resin and give a smooth surface. A hard, black surface bonded to and anchored within the wood surface resulted. It penetrated deeper than a surface coating and produced a harder surface and stronger bond to the wood than a surface coating.

EXAMPLE 6

The mixture of solutions from steps 3-a) or 4-b) was spread on a glass fiber mat. The mixture was then simultaneously pressed and heated to polymerize the solution and consolidate the mat. A fiber-FUR composite was formed.

In the examples, heat from hot press platens was used for reactivating, liquefying and curing the resin as an adhesive, a surface hardener or a matrix resin for fiber composites. Other heat sources such as hot air, microwaves and infra-red would work as well.

The high reactivity of the formulations herein could allow shortened bonding press cycles compared to conventional resins and could also allow the formulations to be accelerators of other resins, such as urea-formaldehyde.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

Zeitsch, K. J 2000. The chemistry and technology of furfural and its many by-products. ACS Sugar series, 13.Elsevier Science BV. 358 p.

The Chemistry of Synthetic Resins by Carleton Ellis, Reinhold Publishing, 1935

Weaver, J W, J F Neilson and L S. Goldstein. 1960. Dimensional stabilization of wood with aldehydes and related compounds. Forest Products Journal, June, pp 306-310.

What is claimed is:

1. A method for producing furfural-urea resin formulations, comprising the steps of:
    a) dissolving urea in hot water to produce a hot aqueous solution;
    b) mixing furfural with said aqueous solution;
    wherein step a) or b) further comprises adding an acidic catalyst, and upon completion of step b), a resinification reaction begins immediately; and
    c) quenching the resinification reaction by cooling to a pre-selected temperature to produce a resin.

2. The method according to claim 1 wherein said acidic catalyst is selected from the group consisting of maleic anhydride, phthalic anhydride, formic acid, citric acid and lactic acid, and wherein when said acid catalyst is maleic anhydride it is mixed with said furfural and said aqueous solution in step b), and wherein when said acid catalyst is not maleic anhydride, it is mixed with said hot aqueous solution in step a).

3. The method according to claim 2 wherein for a concentration of furfural of 100 parts by weight as a base material, said urea is present at about 20 parts by weight, the maleic anhydride is present in a range from about 20 parts by weight, water is present at about 15 parts by weight.

4. The method according to claim 1 wherein step a) includes adding a buffer into said hot aqueous solution to control a pH of said reactive formulation.

5. The method according to claim 4 wherein said buffer is selected from the group consisting of sodium bicarbonate, sodium carbonate, sodium tetraborate decahydrate and sodium formate.

6. The method according to claim 4 wherein said acidic catalyst is selected from the group consisting of maleic anhydride and citric acid, and wherein for a concentration of furfural of 100 parts by weight as a base material, said urea is present in a range of about 20 to about 50 parts by weight, said acidic catalyst is present in a range from about 5 to about 30 parts by weight, said buffer is present in a range from about 0 to about 5 parts by weight, and wherein water is present in a range of about 10 to 200 parts by weight.

7. The method according to claim 4 wherein said acidic catalyst is selected from the group consisting of formic acid and lactic acid, and wherein for a concentration of furfural of 100 parts by weight as a base material, said urea is present in a range of about 20 to about 50 parts by weight, said acidic catalyst is present in a range from about 4 to about 100 parts by weight, said buffer is present in a range from about 0 to about 5 parts by weight, and wherein water is present in a range of about 10 to 200 parts by weight.

8. The method according to claim 2 wherein said acidic catalyst is selected from the group consisting of maleic anhydride and citric acid, and wherein for a concentration of furfural of 100 parts by weight as a base material, said urea is present in a range between about 15 and 20 parts by weight of urea, said acid catalyst is present in a range between about 15 to 20 parts by weight, and wherein said formulation is a resin which forms a hard black polymer with a shore D hardness in a range from about 93 to about 95.

9. The method according to claim 1 wherein said pre-selected temperature is in a range from about 50° C. to about 70° C.

10. The method according to claim 1 wherein said pre-selected temperature is about room temperature.

11. The method according to claim 1 wherein said hot water has a temperature in a range from about 70 to about 100° C.

12. The method according to claim 1 wherein step a) includes adding lignin to said hot aqueous solution.

13. The method according to claim 12 wherein said lignin is present in said aqueous solution in a concentration range from about 20 to about 100 parts by weight based on furfural at 100 parts by weight.

14. The method according to claim 4 wherein said acidic catalyst is maleic anhydride, and wherein for a concentration of furfural of 100 parts by weight as a base material, said urea is present in a range of about 20 to about 50 parts by weight, said maleic anhydride is present in a range from about 5 to about 30 parts by weight, said buffer is present in a range from about 0 to about 5 parts by weight, and wherein water is present in a range of about 10 to 200 parts by weight.

15. A method for producing furfural-urea resin formulations, comprising the steps of:
    a) dissolving urea in hot water to produce a hot aqueous solution of dissolved urea;
    b) making a solution of an acidic catalyst in furfural at a temperature in a range from about 15° C. to about 30° C.;
    c) adding said solution of an acidic catalyst in furfural to said hot aqueous solution of dissolved urea with vigorous stirring to produce a mixed solution in which polymerization of the furfural, urea and the catalyst takes place;
    d) allowing this mixed solution between about 15 to about 30 seconds to react; then
    e) simultaneously cooling, diluting and agitating said mixed solution to quench said polymerization reaction and to disperse the reaction products into small droplets which produces a wet emulsion of partially polymerized droplets that do not continue fast polymerization.

16. The method according to claim 15 including drying the emulsion, making a powder or pre-preg from the dried emulsion.

17. The method according to claim 16 including spreading the wet emulsion on a surface of a material to be bonded and physically contacting the surface to an object to which it is to be bonded and using heat or heat and pressure to cause the formulation to cure thereby bonding the material to the object.

18. The method according to claim 16 including mixing the wet emulsion with fibrous or particulate material and then curing the emulsion by heat, or heat and pressure, to form a composite material.

19. The method according to claim 16 including spreading the wet emulsion on a surface of a porous material, heating the surface to cause the wet emulsion to penetrate into surface layers of the porous material and to cure and harden.

20. The method according to claim 19 including wherein said porous material is selected from the group consisting of wood, particleboard, strand board, fiberboard, kenaf board, corn board, straw board.

21. The method according to claim 19 wherein the surface is heated using any one of a hot press platen, and infrared heater, microwaves and hot air.

22. The method according to claim 16 including spreading said powder or pre-preg on a surface of a porous material, heating the surface to cause the powder or pre-preg to liquefy and penetrate into surface layers of the porous material and to cure and harden.

23. The method according to claim 16 including placing said powder or pre-preg in an assembly and heating it thereby liquefying it and then curing it to a solid adhesive or matrix with continued heating.

24. The method according to claim 22 wherein said porous material is selected from the group consisting of wood, particleboard, strand board, fiberboard, kenaf board, corn board, straw board.

25. The method according to claim 24 wherein the surface is heated using any one of a hot press platen, and infrared heater, microwaves and hot air.

26. The method according to claim 15 wherein said acidic catalyst is selected from the group consisting of maleic anhydride, phthalic anhydride, formic acid, citric acid and lactic acid.

27. The method according to claim 15 wherein said acidic catalyst is maleic anhydride, and wherein for a concentration of furfural of 100 parts by weight as a base material, said urea is present at about 20 parts by weight, the maleic anhydride is present in a range from about 20 parts by weight, water is present at about 15 parts by weight.

28. The method according to claim 15 wherein said acidic catalyst is selected from the group consisting of maleic anhydride and citric acid, and wherein for a concentration of furfural of 100 parts by weight as a base material, said urea is present in a range of about 20 to about 50 parts by weight, said acid catalyst is present in a range from about 5 to about 30 parts by weight, including a buffer present in a range from about 0 to about 5 parts by weight, and wherein water is present in a range of about 10 to 200 parts by weight.

29. The method according to claim 15 wherein said acidic catalyst is selected from the group consisting of formic acid and lactic acid, and wherein for a concentration of furfural of 100 parts by weight as a base material, said urea is present in a range of about 20 to about 50 parts by weight, said acidic catalyst is present in a range from about 4 to about 100 parts by weight, including a buffer present in a range from about 0 to about 5 parts by weight, and wherein water is present in a range of about 10 to 200 parts by weight.

30. The method according to claim 15 wherein said acid catalyst is selected from the group consisting of maleic anhydride and citric acid, and wherein for a concentration of furfural of 100 parts by weight as a base material, said urea is present in a range between about 15 and 20 parts by weight, said acid catalyst is present in a range between about 15 to 20 parts by weight, and wherein said formulation is a resin which forms a hard black polymer with a shore D hardness in a range from about 93 to about 95.

* * * * *